United States Patent Office 3,798,134
Patented Mar. 19, 1974

3,798,134
METHOD OF MAKING AN ELECTROTYPE SHELL
James A. Hynes, Winnetka, Ill., assignor to Printing Plate Supply Co., Chicago, Ill.
Filed Nov. 15, 1971, Ser. No. 198,955
Int. Cl. B41m 5/02; B51c 3/08
U.S. Cl. 204—6
8 Claims

ABSTRACT OF THE DISCLOSURE

An electrotype printing shell is made by first making a negative film of the subject matter to be printed and then making a positive master of a photopolymer photosensitive material from the negative film. A soft, flowable polymer material is then spread over the positive master and the liquid material is then polymerized such that a thin molded layer is formed on the positive master. The thin molded layer is then removed and sensitized followed by electroplating a printing shell material on the sensitized molded layer functioning as a mold. Lastly, the printing shell is removed from the molded layer mold.

---

One of the weaknesses of the electrotype in adapting to modern printing methods is that it cannot be made successfully without going through the steps of preparing an engraving and setting hot type. Other types of printing plates, including offset plates and letterpress plates made from photosensitive materials can be made directly from film with consequent saving in speed and cost and with utilization of phototypesetting and other speedy methods. The present invention makes it possible to prepare an electrotype from film without the use of an engraving or hot type.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
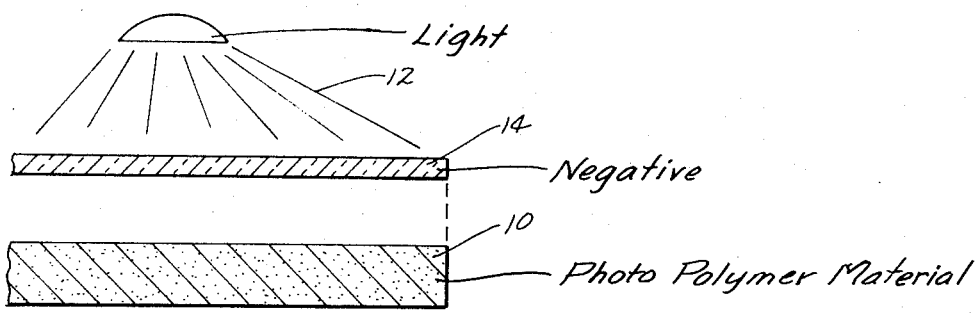
FIG. 1 illustrates a positive master being formed from a negative.

The first step in the method is to prepare a positive master from a negative film. This can be done by using any one of a number of photosensitive materials including photosensitized metals and photopolymers. After the positive plate is prepared, the next step is to mold a material into the master to create a negative corresponding to the negative film used. Any liquid, paste, sheet or other material can be used which is sufficiently soft initially so that it will flow into the recesses of the positive master or can be readily molded into it without sufficient heat or pressure to damage the master and yet can be hardened in place sufficiently to remove it from the master and use it as a mold for making an electrotype.

At the present time, an electrotype shell is made from a molding sheet of polyvinylchloride which is molded into a form containing hot type and engravings. If the photopolymer positive master could stand the heat and pressure, this polyvinylchloride molding sheet could be used as a molding material. PVC has been used as a molding material with photopolymer masters in a very limited number of applications, but because many of the photopolymers from which the master could be made do not act well under the heat and pressure required to mold a polyvinylchloride sheet, the method has not been widely adopted.

In the present method, a soft or liquid unpolymerized or uncured material is molded into the positive master and then hardened by chemical interaction, light or other means of causing it to polymerize, thus creating a polymerized or cured plastic molded sheet which is an excellent reproduction of the negative film. This sheet can then be stripped from the positive master and placed into a plating tank and plated with metal as is done with the usual electrotype molding sheet. Then the electrotype shell can be stripped off and used to make a plate in the usual fashion. A wide variety of photopolymer materials and sensitizing agents are available and may be selected as required. U.S. Pat. 3,060,027, Oct. 23, 1962, is representative of the status of the photopolymer art and application to printing plates.

The polymer materials found particularly suitable for making printing forms according to the present invention are polyamides, and may be homopolymers or copolymers, or mixtures of homopolymers and copolymers of polyamides. The polyamides may be natural or synthetic. The synthetic materials may be polymers of one or more dicarboxylic acids with one or more diamines, or may be produced by polymerization processes using diamine salts of dicarboxylic acids with aminocarboxylic acids. Aromatic, aliphatic and araliphatic monomers can be used in the synthesis. Copolymers containing aminocaproic acid, or caprolactam, are particularly advantageous. Exemplary of the latter class of polyamide materials are 60–40 or 50–50 copolymers of hexamethylenediamine adipate and caprolactam, the proportions being by weight; copolymers of aminocaproic acid and ketopimelic acid hexanediamine containing, for example, 85 parts by weight of aminocaproic acid; a copolymer of 40 parts by weight of caprolactam, 35 parts by weight of hexamethyleneadipate, and 25 parts by weight of ketopimelic acid hexanediamine; copolymers of p-phenylenedipropionic acid and caprolactam, for example in a 9:1 ratio by weight; copolymers containing equal parts by weight of caprolactam and 4,4'-diaminodicyclohexylmethane adipate; copolymers of equal parts by weight of caprolactam, 4,4' - diaminodicyclohexyl methane, and hexamethylenediamine adipate; mixtures of these materials, etc. Natural polyamides such as zein (derived from corn), gliadin (derived from wheat), and hordein (derived from barley) show particularly good resistance to attack by benzine, chlorinated hydrocarbons and water, and can be used to particular advantage in printing forms of the type herein described.

An electrotype printing shell made from film has many advantages over other types of printing shells. The method of this invention has special advantages over conventional methods of making acceptable electrotype printing shells. It is not necessary to make engravings and hot type and lock them into a form. The elimination of hot type and engravings saves considerably in cost and time. The electrotype printing shell produced by the method of this invention is extremely precise and level compared to an electrotype made from type and engravings. In the latter, the parts of the type and engravings often differ in height and this has to be compensated for by some suitable method. The method of this invention, however, produces a very superior electrotype printing shell both in printing quality and uniformity.

The practice of printing directly from photopolymer plates has the disadvantage that it is difficult to adjust the tone or correct errors. By producing an electrotype printing shell from film, many adjustments can be made in the electrotype which cannot be made in a photopolymer printing plate.

An electrotype printing shell made in accordance with the method of this invention has the advantage over conventional methods that the work required on it after the electrotype is made into a plate is reduced because routing can be greatly reduced or eliminated. The areas to be routed would be etched or washed out of the master so that the final electrotype made by this process would not have to be routed nearly so much, if at all. Electrotypes made by this method are more accurate than the electrotypes made in the conventional way because the PVC molding material tends to orient or shrink undesirably after it is heated and cooled and the pressure is removed. Thus, it often does not precisely reproduce the type and half-tone areas of the engravings and type forms from which it was made. Also the new method results in a better mold since a liquid or soft polymer conforms more easily to the master than PVC.

An example of the polymer hardened by chemical action for use in making the negative from the positive master is the resin made by Shell Oil Company under the trademark "Epon," Type No. 828. This resin is mixed with a liquid polysulfide polymer manufactured by Thiokol Chemical Corporation, Trenton, N.J., under the product designation LP-8. The epon resin is preferably 70% by weight and the polysulfide polymer is preferably 20% by weight. This mixture is then poured over the positive master and is treated with a 10% by weight solution of triethylene tetraamine. The polymer cures in approximately 30 minutes and may be peeled off the master.

An example of a photopolymer which may be used is a urethane type resin having light sensitive material therein which is manufactured under the trade designation "Leterflex" by W. R. Grace and Company, Clarksville, Md. This urethane resin is commonly used in the manufacture of newspaper printing plates. The resin is poured over the master and is exposed to ultraviolet light which causes it to polymerize.

Another advantage of this method is that the film or the positive master made from film could be shipped around the country to various printers and platemakers. Under some circumstances, the positive master could be used directly as a printing plate. Under some circumstances, the positive master could be used to make an electrotype by the present method. This would give considerable flexibility to the printers in choice of plates, depending on the length of their run and their local situation.

This method also makes it possible to use a material as the positive master which is not tough enough to be capable of standing the pressures and stresses and other conditions under which a printing plate must operate. All it has to be capable of is to serve as a master into which the unpolymerized molding material could be molded and it could be a much less highly developed material than is required for a positive which is intended to become a printing surface. This should make the reproduction of the master much less expensive since a less press-worthy or less expensively supported photo-sensitive material could be used since it would not have to withstand as much heat and pressure as the PVC must stand. All it would have to be capable of doing is to be accurately molded and then to support the plating process in making electrotypes. The combination of an inexpensive photosensitive master and electrotype made from an inexpensive polymerizable molding material might be competitive in cost with a photo-sensitized metal or photopolymer positive to be used as a printing plate. In any case, there are many printing production runs where an electrotype made from film would be more desirable and more economic than a photo-sensitive, etched printing plate made from the same film.

Figure 2:
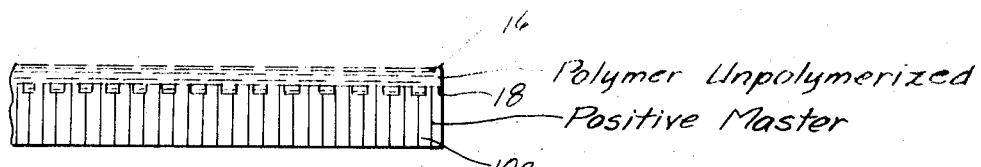
FIG. 2 illustrates an unpolymerized polymer being applied to the positive master.
Figure 3:
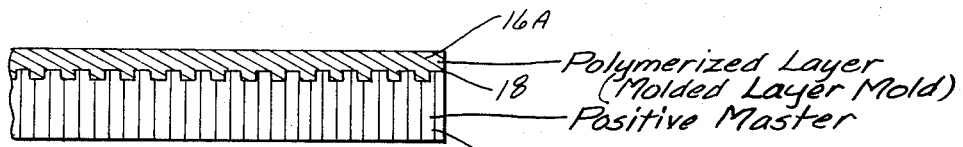
FIG. 3 illustrates the polymer after it has been polymerized on the positive master.
Figure 4:
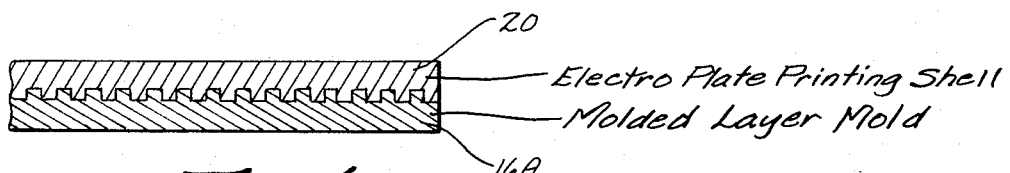
FIG. 4 shows the molded layer after it has been separated from the positive master and now having an electroplate printing shell thereon.
Figure 5:
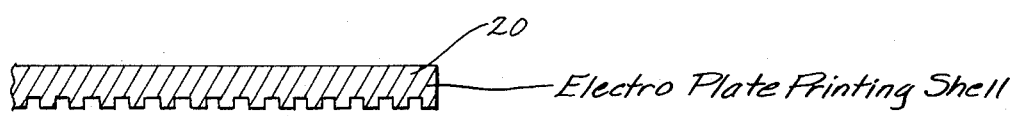
FIG. 5 shows the electroplate printing shell after it has been separated from the molded layer mold.

Referring specifically to FIGS. 1–5 the steps of the method of this invention are illustrated starting with FIG. 1 wherein a positive master is produced from a negative by photopolymer material 10 being polymerized by light 12 passing through a negative 14. In FIG. 2 it is seen that the photopolymer material which has been polymerized becomes the positive master 10A and unpolymerized polymer material 16 is spread on the positive master 10A. A printing face 18 is provided on the positive master and is transferred to the polymerized layer (molded layer mold) 16A, as seen in FIG. 3. The polymerization of the polymer 16 occurs as discussed herein by the application of light or chemical interaction and without substantial heat or pressure. In FIG. 4, the molded layer mold 16A has been separated from the positive master 10A and now has been provided with an electroplate printing shell 20 by first sensitizing the molded layer and then electroplating the printing shell 20 thereon. Finally, in FIG. 5 the electroplate printing shell 20 has been separated from the molded layer mold 16A and is ready for use in printing applications.

Thus it is seen that the method of this invention produces a master which can be plated and from which an electrotype printing shell is made. The heart of this method is in the fact that a soft or liquid unpolymerized material is used in the positive master mold produced from film and thus is able to reproduce that positive master in the form of an electrotype printing shell quite rapidly and simply. The undesirable step of applying heavy pressure and heat has been eliminated.

Although an electrotype plate as the end product is preferred it is understood that duplicate engraving plates may be produced. The master may be an etched photopolymer plate or an etched metal plate. The polymerization step appears to be most suitably accomplished by the application of ultraviolet light. Alternatively, chemical interaction and other methods of causing polymerization may be used. It is understood that while normally the method of this invention is started by using a negative film and making a positive master therefrom, it is contemplated that a positive film could be used and a negative master made therefrom.

I claim:

1. The method of making an electrotype printing shell, comprising;
    making a negative film of the subject matter to be printed;
    making a positive master from said negative film by exposing a photopolymer material to light passing through said film;
    imposing a soft flowable unpolymerized polymer material over said positive master, said polymer being susceptible to polymerization by light or chemical interaction;
    curing said polymer material through the application of light or chemical interaction and without heat or pressure so that said polymerized polymer material forms a molded layer on said positive master;
    removing said molded layer from said positive master;
    sensitizing said molded layer for electroplating;
    electroplating a printing shell material on said molded layer; and
    removing said printing shell material from said molded layer wherein the curing of said polymer material is accomplished by polymerization through the application of light or chemical interaction.

2. The method of claim 1 wherein the photopolymer is selected from the group consisting of natural and synthetic polyamides and homopolymers or copolymers or mixtures of homopolymers and copolymers of natural and synthetic polyamides.

3. The method of claim 1 where the uncured polymer material is a liquid.

4. The method of claim 1 where the uncured polymer material is in the form of a soft sheet.

5. The method of making a printing shell comprising making a negative film of the subject matter to be printed;

making a positive master from said negative film by exposing a photopolymer material to light passing through said film;

imposing a soft flowable polymer material over said positive master;

polymerizing said polymer material through the application of light or chemical interaction and without heat or pressure so that said polymer material forms a molded layer on said positive master, said photopolymer being susceptible to polymerization by light or chemical interaction;

removing said molded layer from said positive master; and using the molded layer to produce a printing shell.

6. The method of claim 5 wherein the photopolymer is selected from the group consisting of natural and synthetic polyamides and homopolymers or copolymers or mixtures of homopolymers and copolymers of natural and synthetic polyamides.

7. The method of claim 5 wherein said printing shell is an electrotype printing shell.

8. The method of claim 5 wherein said printing shell is a duplicate engraving.

References Cited

UNITED STATES PATENTS

| | | | |
|---|---|---|---|
| 2,400,518 | 5/1946 | Kreber et al. | 204—6 |
| 2,670,326 | 2/1954 | Bungay | 204—6 |
| 2,834,052 | 5/1958 | Hunn | 204—6 |
| 3,060,027 | 10/1962 | Freundorfer et al. | 96—35.1 |
| 3,441,487 | 4/1969 | Rea et al. | 204—6 |
| 3,554,875 | 1/1971 | McKinney et al. | 204—6 |
| 3,565,778 | 2/1971 | Folger et al. | 204—6 |

FOREIGN PATENTS

| | | | |
|---|---|---|---|
| 1,219,308 | 6/1966 | Germany | 204—6 |

THOMAS TUFARIELLO, Primary Examiner

U.S. Cl. X.R.

96—35.1; 101—463